May 31, 1927.
J. F. GAIL
METAL JOINT
Filed June 23, 1919
1,630,338
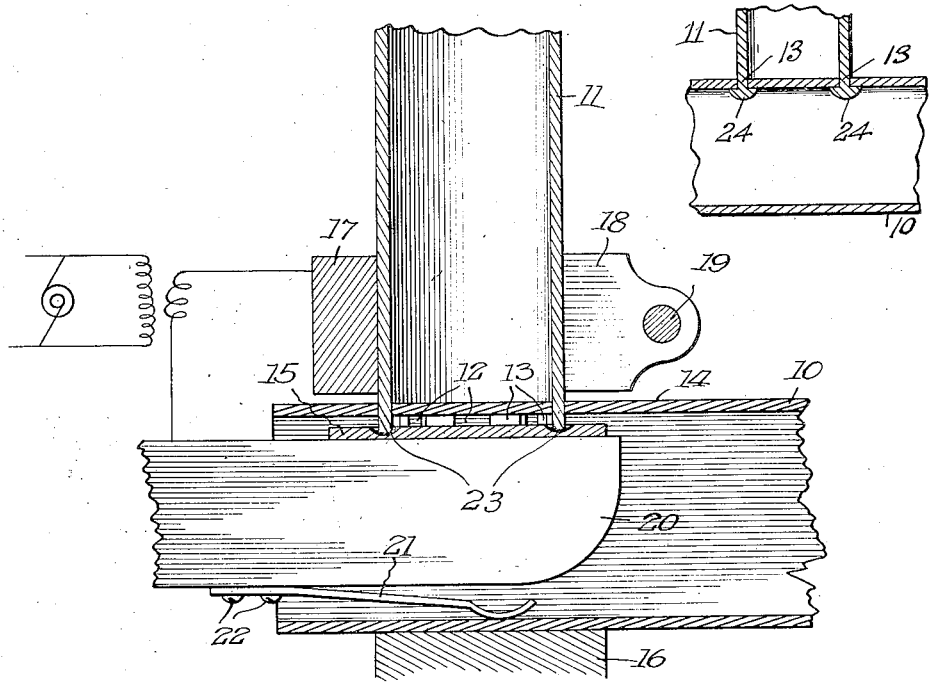
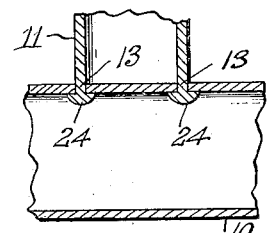
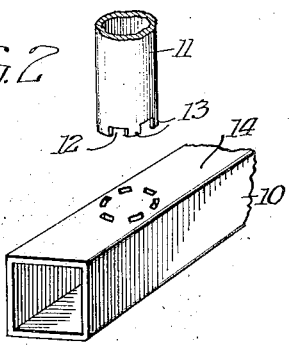
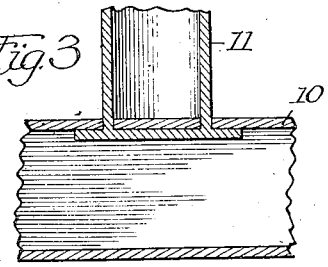
Inventor:
John F. Gail,
By Offield Towle Graves & Soans
attys.

Patented May 31, 1927.

1,630,338

UNITED STATES PATENT OFFICE.

JOHN F. GAIL, OF EVANSTON, ILLINOIS, ASSIGNOR TO SIMMONS COMPANY, OF KENOSHA, WISCONSIN, A CORPORATION OF DELAWARE.

METAL JOINT.

Application filed June 23, 1919. Serial No. 305,976.

My invention relates to improvements in metal joints and is of particular service when connecting together sheet metal parts disposed at an angle to each other.

The principal object of the invention is to provide an improved joint or connection between a pair of metallic members disposed at an angle to each other; to provide a joint which is of particular value for connecting together two thin-walled angularly disposed tubular parts; to provide a suitable process for producing said joint, and in general to provide an improved construction and process of the character referred to.

In the drawing illustrating a specific application of my invention, Fig. 1 illustrates the parts arranged preparatory to being joined together in accordance with my invention.

Fig. 2 is a perspective view of the two parts before they are assembled, and

Fig. 3 is a section through the completed joint shown in Fig. 2.

Figure 4 is a view similar to Figure 3, showing a modification of the joint.

In the drawings, 10 represents a thin-walled tubular member of rectangular cross section, and 11 represents a thin-walled tubular member of circular cross section which is to be united to the tube 10, said tubes in this case having their axes disposed at substantially right angles to each other.

In making the joint the first operation is to notch out the squared off end of the tube 11, as shown at 12 in Fig. 2, a number of notches being cut in the end of the tube to provide several depending tongues, or extensions 13. The notches 12 are cut deep enough so that after the upper wall 14 of the tube 10 has been perforated to admit said tongues 13, the lower ends of the tongues will project slightly within the tube 10, as clearly illustrated in Fig. 1.

After the tubes 10 and 11 have been assembled together, as shown at Fig. 1, a locking plate 15 is placed in contact with the protruding ends of the tongues 13, and an electric current of welding strength is conducted through the several areas of contact between the plate and the ends of said tongues whereby a butt-weld is effected between the tongues and the plate. During the time that welding current is being applied, pressure is exerted between the plate and the tongue while maintaining the tubes 11 and 10 in tight-fitting engagement with each other. Thus, when the abutting parts are fused or softened by the current, the plate 15 approaches and engages the wall of the tube 10, the two tubes thus being rigidly united together.

Any convenient form of welding equipment may be employed to carry out the process. In the present instance I have indicated the apparatus somewhat diagrammatically.

For conducting electric current into the tube 11, I may use an electrode shoe 17 made in the form of a clamp split at one side, as shown at 18 and equipped with clamping bolt 19, whereby the electrode 17 may be securely locked into tight fitting engagement with the tube 11. Current is conducted to the plate 15 by means of a copper beak-electrode 20. The end of the electrode 20 is forced upwardly by any suitable means, in the present instance such means being shown as a plate spring 21 having its rear end suitably secured to the electrode as by rivets 22 and having its front end arranged to engage the lower wall of the tube 10.

It should be noted that in order to keep the tube 11 pressed tightly into engagement with the tube 10, a sufficient amount of downward pressure is applied to the shoe 17 to overcome the upward pressure due to the spring 21. Any suitable support 16 may be employed under the tube 10 in order to resist the pressure applied through the clamp electrode 17.

When the current is turned on the points of the tongues 13 will soften and fuse and a weld will be effected between them and the upper surface of the plate 15, which latter as the metal softens, will move upwardly into engagement with the inner surface of the wall of the tube 10. After the plate 15 has engaged, or substantially engaged, the wall of the tube, the current is turned off and after the weld cools the parts will be found to be locked rigidly and securely together as indicated in Fig. 3.

Depressions 23 may, if desired, be formed in the upper surface of the plate 15 so as to receive and upset the ends of the projections 13 as the latter are fused and consolidated with the plate, or a plate 15 may be employed which is of different material than the tube 11, so that consolidation of the projections 13 with the plate 15 does not occur, and in such case, the operation of welding will form heads 24 on the ends of the projections 13 so as to lock the tube 11 onto the tube 10. Obviously, when the plate is so used it may be separable from the copper beak 20 or may be made integral with or permanently secured thereto, so as to be inserted and removed with the beak 20.

The scope of the invention should be determined by the appended claims, which are to be interpreted as broadly as possible consistent with the state of the art.

I claim:

1. In a metal joint, the combination of a plate member having an opening therethrough, a sheet metal member extending at an angle from said plate member and having a tongue extending from one edge and through said opening and also having a shoulder at the base of said tongue seated against one side of said plate, and a retaining plate engaging the other side of said first plate and buttwelded to the end of said tongue.

2. In a metal joint, the combination of a plate member having an opening therethrough, a tubular member extending at an angle from said plate and having a tongue extending from its edge and through said opening and also having a shoulder at the base of said tongue seated against said plate, and a retaining member abutted against the end of said tongue and integrally united therewith.

3. In a metal joint, the combination of a tubular member having a plurality of integral tongues extending from one end thereof, a plate extending transversely across said end, and having a plurality of apertures therethrough, through which said tongues are projected, and a common retaining head on the opposite side of said first mentioned plate and welded to the ends of said tongues.

4. In a metal joint, the combination of a tube having a plurality of tongues at one end, another tube extending transversely across the end of the first mentioned tube and having apertures in the wall thereof, corresponding to the tongues of the first tube, through which the said tongues are inserted, and a common retaining head inside the second mentioned tube welded to the inner ends of said tongues, so as to hold the first tube in a fixed angular relation to the second tube.

5. In a metal joint, the combination of a tube having a plurality of integral extensions at spaced intervals around one end thereof, another tube extending transversely across the end of the first mentioned tube and having apertures in its side wall, corresponding to the said extensions, through which the latter are inserted so that the end portions of the tube intermediate of the extensions are flush against the outer face of the second mentioned tube, and a plate inside the latter tube and welded to the inner ends of all the said extensions so as to hold the first mentioned tube in a fixed angular position, with reference to the second mentioned tube.

JOHN F. GAIL.